United States Patent Office 3,534,588
Patented Oct. 20, 1970

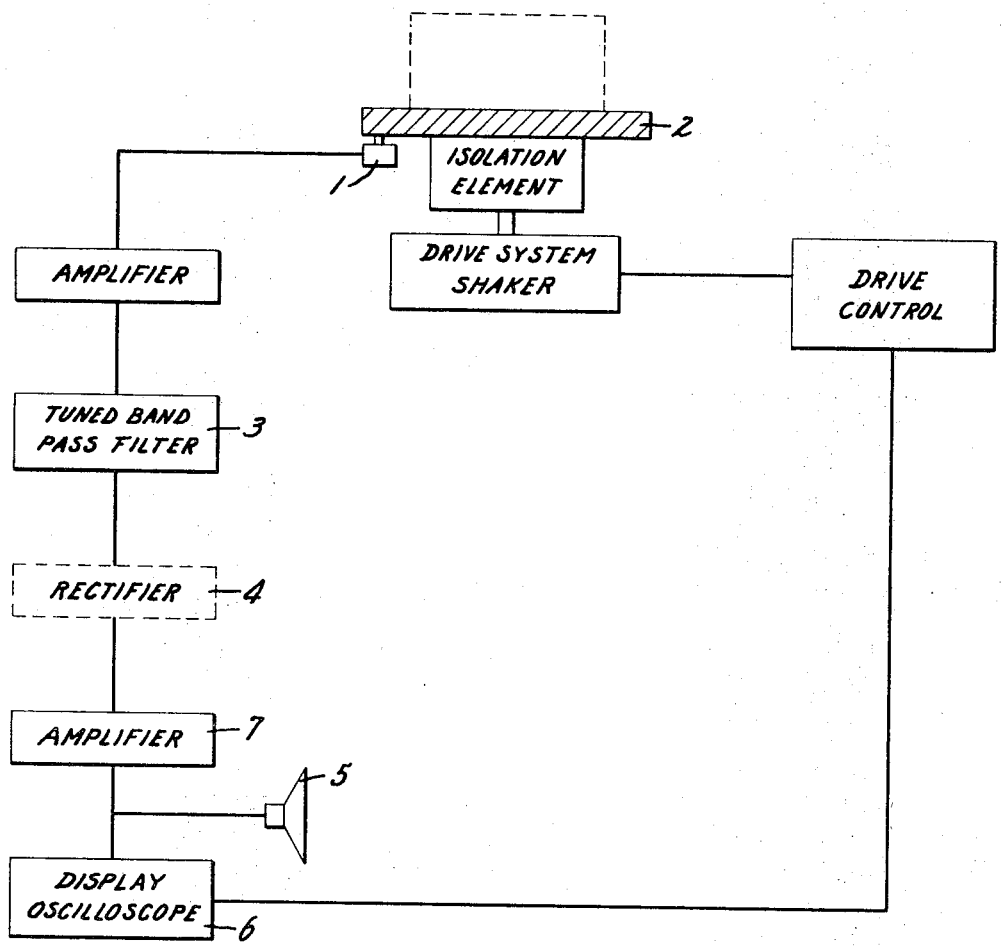

3,534,588
SYSTEM FOR DETECTING LOOSE PARTS
Max W. Schulz, Scotia, N.Y., assignor to General
Electric Company, New York, N.Y.
Filed Apr. 26, 1967, Ser. No. 633,770
Int. Cl. G01m 7/00
U.S. Cl. 73—67                                  3 Claims

ABSTRACT OF THE DISCLOSURE

An improved system for detecting loose parts and free objects in which the presence of loose parts and free objects in an assembly is detected by shaking the assembly and the impacts of objects and parts is electronically detected and supplied to one input circuit of an analyzing means. A signal corresponding to the frequency of the shaking is supplied to another input circuit of the analyzing means and the input signals are compared to give an indication of the condition of the assembly. A limited portion of the frequency spectrum is selectively supplied to the input circuit of the analyzing means and the supporting plate of the assembly and the accelerometer are tuned for maximum coupling.

---

My invention relates to an improved system for detecting loose parts and particularly loose parts and free objects in manufactured assemblies.

My invention sets forth improvements in the basic system of the application to Joseph B. Gibbons and Max W. Schulz Ser. No. 619,444, filed Feb. 28, 1967. The disclosure of that application is incorporated by reference herein. In the application of Gibbons and Schulz an assembly is shaken and the impacts of objects and particles are electrically detected and supplied to one input circuit of an analyzing means. A signal corresponding to the frequency of the shaking is supplied to another input circuit of the analyzing means and the two input signals are compared to give an indication of the condition of the assembly.

Previous systems have used a shaker to vibrate an object and detect rattling within the object by microphone which detects ultrasonic vibrations. These frequencies are converted to the audible range in order that particles within the object give indications in the audible range. My invention distinguishes over this type apparatus since my invention has considerably greater selectivity and sensitivity and my apparatus distinguishes one type particle from another more precisely.

It is an object of my invention to provide an instrument of high sensitivity.

It is a principal object of my invention to provide a detection system which accurately detects lighter particles.

In brief, my invention is an improved system for detecting loose particles and free objects in an assembly. My improvements are in the use of an accelerometer with maximum coupling to a supporting plate by making the fundamental frequency of the accelerometer near that of the plate for maximum transmission of energy and by having tight mechanical coupling. Also, I use a tuned band-pass filter to heighten the sensitivity of the system to frequencies corresponding to various particle sizes and weights which are to be detected and I may rectify the signal from the filter to enhance the response.

The foregoing and other objects, features, and advantages of the invention will be apparent from the following more particular description of preferred embodiments of the invention, as illustrated in the accompanying drawing.

In this drawing, the single figure is a schematic diagram illustrative of the system and my improvements thereon.

My improvements are basically four in number and are individually described below.

First in my apparatus the accelerometer 1 and supporting plate 2 are mechanically closely coupled and tuned to the same fundamental frequency. This is possible because every plate which is subjected to impacts has places on it that vibrate with a greater intensity than at other places on the plate. Likewise, an accelerometer responds better when moved along certain axes than when moved along other axes. Further, each accelerometer gives maximum response at some fundamental frequency. In my invention, the plate and accelerometer are matched to have resonance frequencies at about the same frequency so that objects within the apparatus which impinge upon the apparatus and transmit their force to the plate causing the plate to vibrate. This vibration is transmitted in a maximal way to the accelerometer because the accelerometer is coupled as closely as possible to the plate and resonates with the plate.

Proper location, orientation and mechanical tuning between the plate and accelerometer gives maximum transmission of vibration from the plate to the accelerometer and the coupling between the plate and the accelerometer is as close as possible.

Output signals from accelerometer 1 are supplied to a tuned band-pass filter 3 which can be tuned to a greater or lesser frequency and band width thus allowing a broader or narrower band of signal frequencies to pass through the filter. The frequency may be varied according to the weight of the particle which it is desired to detect. For example, it has been found empirically that parts and objects on the order of 0.1 milligram weight are most easily detected by frequencies on the order of 60–70 kilocycles. Similarly, parts and objects on the order of 1–2 milligram weight are most easily detected by frequencies on the order of 20–30 kilocycles. This adds another dimension to the information which may be ascertained from this apparatus, namely, particle mass or weight. The particle weight is found within a rough range by the frequency at which it is most easily detected.

Signals passing through the tuned band-pass filter are rectified by a rectifier 4 to sharpen the image on the screen of the display oscilloscope 6 which functions as an analyzer. Additionally, rectifier 4 provides a clearer indication in earphones or speaker 5 of the impacts of individual particles on the plate 2. The use of the loudspeaker 5 or earphones after the second amplifier 7 thus enhances the sensitivity of the apparatus and serves as an emergency or auxiliary detecting element. By the use of earphones or a loudspeaker the operator is able to hear individual impacts and the ear quickly learns to interpret the different sounds coming over the system. Use of the loudspeaker or earphones alone sometimes present a problem inasmuch as it is difficult to describe what is being heard. However, when used with the display oscilloscope 6, the two permit accurate identification.

These features and improvements of the basic system described in the application of Joseph Gibbons and Max Schulz give a system which provides both detection of smaller parts and also information as to whether they are loose or free and as to their mass.

What I claim as new and desire to secure by Letters Patent of the United States is:

1. Apparatus for detecting and differentiating between free objects of differing weights in an assembly comprising:

a mounting plate on which said assembly is mounted,
a drive system for producing mechanical vibrations of a predetermined frequency, said drive system inherently producing frequencies higher than said predetermined frequency, means for coupling said drive system to said plate to produce vibrations of said predetermined frequency, said means having a structure which decouples vibrations of frequencies higher than said predetermined frequency from passing to said plate, an accelerometer mounted on said plate for sensing vibrations produced by moveable objects impacting on said assembly and for developing electrical signals in accordance with said impacts, an amplifying channel for amplifying said electrical signals, said channel including a band pass filter tunable over a broad range of frequencies to selected bands of frequencies corresponding to free objects of differing weights, indicating means responsive to the output of said amplifying channel for indicating the signal passed by said tunable band pass filter.

2. The combination of claim 1 in which said accelerometer has a resonant frequency close to the resonant frequency of said mounting plate.

3. The combination of claim 2 in which said accelerometer and said plate are oriented to provide maximum vibrational coupling therebetween.

References Cited

UNITED STATES PATENTS

| 2,305,783 | 12/1942 | Heymann et al. | 73—67 |
| 3,017,607 | 1/1962 | Rubens et al. | 73—67.1 |
| 3,282,087 | 11/1966 | Dickinson | 73—71.5 |

RICHARD G. QUEISSER, Primary Examiner

J. P. BEAUCHAMP, Assistant Examiner

U.S. Cl. X.R.

73—71.6